Oct. 15, 1957 R. N. KNIGHTS 2,809,721
TELESCOPIC STRUTS
Filed May 3, 1954 4 Sheets-Sheet 1

Oct. 15, 1957   R. N. KNIGHTS   2,809,721
TELESCOPIC STRUTS

Filed May 3, 1954   4 Sheets-Sheet 2

INVENTOR
Richard N. Knights
BY Reynolds, Bush & Christen
ATTORNEY

Oct. 15, 1957    R. N. KNIGHTS    2,809,721
TELESCOPIC STRUTS

Filed May 3, 1954    4 Sheets-Sheet 3

INVENTOR
Richard N. Knights
BY Reynolds, Beach & Christman
ATTORNEY

Oct. 15, 1957 R. N. KNIGHTS 2,809,721
TELESCOPIC STRUTS

Filed May 3, 1954 4 Sheets-Sheet 4

INVENTOR
Richard N. Knights
BY Reynolds, Beach & Christensen
ATTORNEY

United States Patent Office 2,809,721
Patented Oct. 15, 1957

2,809,721

TELESCOPIC STRUTS

Richard N. Knights, Hucclecote, England, assignor to Dowty Equipment Limited, Cheltenham, England Application May 3, 1954, Serial No. 427,142

Claims priority, application Great Britain May 5, 1953

4 Claims. (Cl. 188—67)

This invention relates to telescopic mechanical struts of the kind incorporating means for locking the telescopic components of the strut in their extended relationship. A strut of this kind may, for example, form a structural part of an aircraft retractable wheel mounting in which the mounting and with it the strut are extended by a power-operated jack and retracted also by the jack. There is sometimes a danger that the strut may not become fully extended to the position where the lock acts positively, and it becomes even more important to guard against this eventuality with a telescopic strut than with a folding strut, because an unlocked telescopic strut, and especially one which is not itself hydraulically extensible, will collapse under load whereas the jack pressure may be sufficient to hold a folding strut in line even if the "down" lock is ineffective.

The principal object of the present invention is to provide a telescopic mechanical strut whose ultimate extension movement to the position in which the "down" lock acts positively is not wholly dependent upon the normal extension movement of the wheel mounting.

More specifically, the object of the invention is to provide a construction of telescopic mechanical strut incorporating power-operated means for assisting the ultimate extension of the strut to the position in which the "down" lock acts positively.

Another object is to provide a form of lock with power-operated means therefor together combining the functions of assisting the ultimate extension and performing the locking of the telescopic components of the strut.

A further object of the invention is to provide an improved form of lock of the kind comprising a circular row of tongues mounted in one component and expansible by said power-operated means into locking engagement with a locking groove formed in the other component.

The invention is illustrated by way of example in the accompanying drawings, of which:

Figure 1:
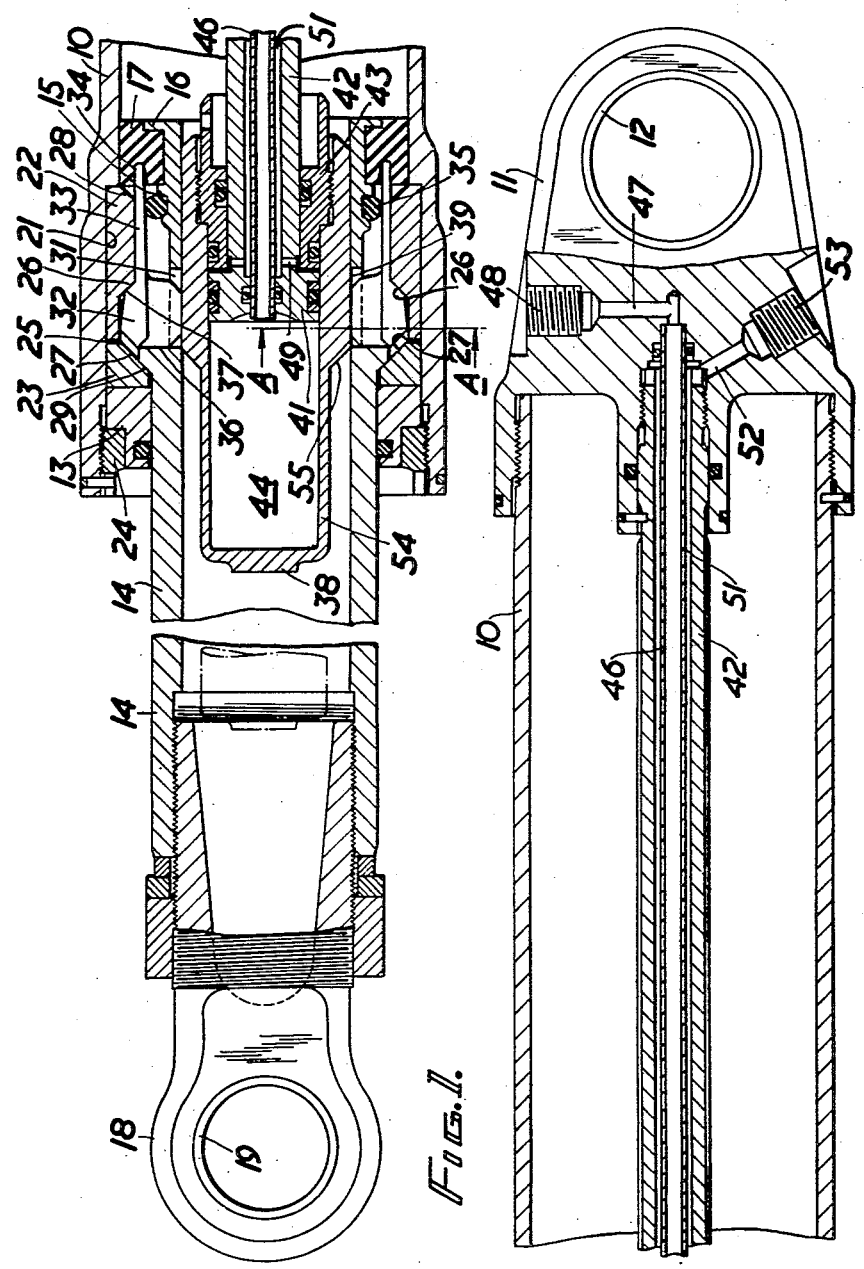
Figure 1 is a central sectional view of a telescopic mechanical strut showing the two tubular parts thereof fully extended and locked.

Referring to Figure 1, the telescopic strut comprises an outer tubular component 10 having an end fitting 11 formed with a circular aperture 12 for an anchorage pin or the like, while the other end of the tubular component 10 is formed to receive an outer slide bearing 13 for an inner tubular component 14. The inner end of the component 14 has spaced flanges 15 and 16 which locate endwise an inner slide bearing 17 formed in two semi-circular parts which slide within the bore of the outer tubular component 10, while the outer end of the component 14 is fitted with a head 18 having a circular opening 19 for the reception of an attachment pin or the like.

The end portion of the outer tubular component 10 which overlaps the inner tubular component 14 is formed with a stepped bore 21 which receives an annular locking sleeve 22, and a retaining ring 23 together with the outer slide bearing 13 as aforesaid, these parts being rigidly clamped together within the stepped bore 21 by a screw-threaded locking ring 24. A shim 25 is interposed between the locking sleeve 22 and the retaining ring 23 for adjustment purposes as will be hereafter referred to. The locking sleeve 22 and the retaining ring 23 together define an annular groove whose base is of a diameter substantially equal to that of the bore of the outer tubular component 10 and whose sides are formed by frusto-conical abutment surfaces 26 and 27 on the locking sleeve 22 and retaining ring 23 respectively. The locking sleeve 22 is moreover, formed with a second frusto-conical abutment surface 28 disposed adjacent the step at the end of the bore 21. In effect the locking sleeve 22 and the relatively fixed retaining ring 23 constitute an internally circumferentially grooved locking collar.

The inner tubular component 14 is formed with a further flange 29 which extends radially outwardly beyond the inner diameter of the retaining ring 23 so that the latter limits outward extension of the inner tubular component 14. A circular row of rectangular slots 31 are formed in the inner tubular component 14 extending from the flange 29 towards the inner end of the component 14, and each slot 31 is arranged to receive and locate the head 32 of an individual locking tongue 33 which extends longitudinally between the locking sleeve 22 and the inner tubular component 14. The tails of the locking tongues 33 are pivotally located in a circular recess 34 which is formed around the inner slide bearing 17, while a resilient rubber ring 35 located on the inner tubular component 14 acts on the several tongues 33 to spread their heads 32 outwardly. The head 32 of each tongue has a transverse end face 36 which abuts the flange 29 of the tubular component 14, and an inclined face 37 which is engageable with the frustoconical face 26 of the locking sleeve 22 when the strut is fully extended as in Figure 1. In this position the locking tongues 33 are held outwardly by a cylindrical plunger 38 which has a full diameter surface 39 slidable within the inner tubular component 14 and under the radially inner surfaces of the locking tongue heads 32 so as to resist inward movement of the heads 32 under compressive loads applied to the strut.

The plunger 38 is mounted slidably on a fixed piston 41 which is formed on the free end of a stem 42 extending centrally from the end fitting 11, and an annular gland nut 43 having screw-threaded engagement with the plunger 38 is slidable on the stem 42 in sealing engagement therewith. The piston 41 thus separates a cylindrical chamber 44 within the plunger 38 (Figure 1) from an annular chamber 45 (Figure 2) of lesser area between the stem 42 and the bore of the plunger 38. The chamber 44 communicates by way of a tube 46 mounted centrally within the stem with a transverse passage 47 and screw-threaded connection 48 in the end fitting 11, while the chamber 45 within the plunger 38 but at the opposite side of the piston 41 opens by way of radial holes 49 into an annular passageway 51 between the bore of the stem 42 and the tube 46, this passageway 51 opening into a second transverse passage 52 and screw-threaded connection 53 in the end fitting 11. The outer end portion of the plunger 38 has a surface 54 of reduced diameter separated from the full diameter surface 39 by an inclined step 55 so that on extension of the plunger 38 (movement towards the left) the full diameter surface 39 passes underneath the locking tongue heads 32, while on contraction (movement towards the right) the reduced diameter surface 54 passes underneath the locking tongue heads 32.

If, therefore, fluid pressure acts in the annular chamber 45 alone to withdraw the plunger 38 fully and a compressive load is applied by external means to the strut, the frusto-conical surface 26 of the locking sleeve acting on the inclined surface 37 of each head 32 will cause the several tongues 33 to contract inwardly towards the reduced diameter surface 54 of the plunger 38 against the restoring force of the resilient rubber ring 35, enabling the heads 32 to pass under the internal surface of the locking sleeve 22 with progressive inward movement of the inner tubular component 14. Once the heads 32 have passed behind the locking sleeve 22 at 28 they will spring outwardly against the bore of the outer tubular component 10 under the action of the ring 35, so that on continued contracting movement of the strut the locking tongue heads 32 can pass freely over the full diameter surface 39 of the plunger 38.

Figure 2:
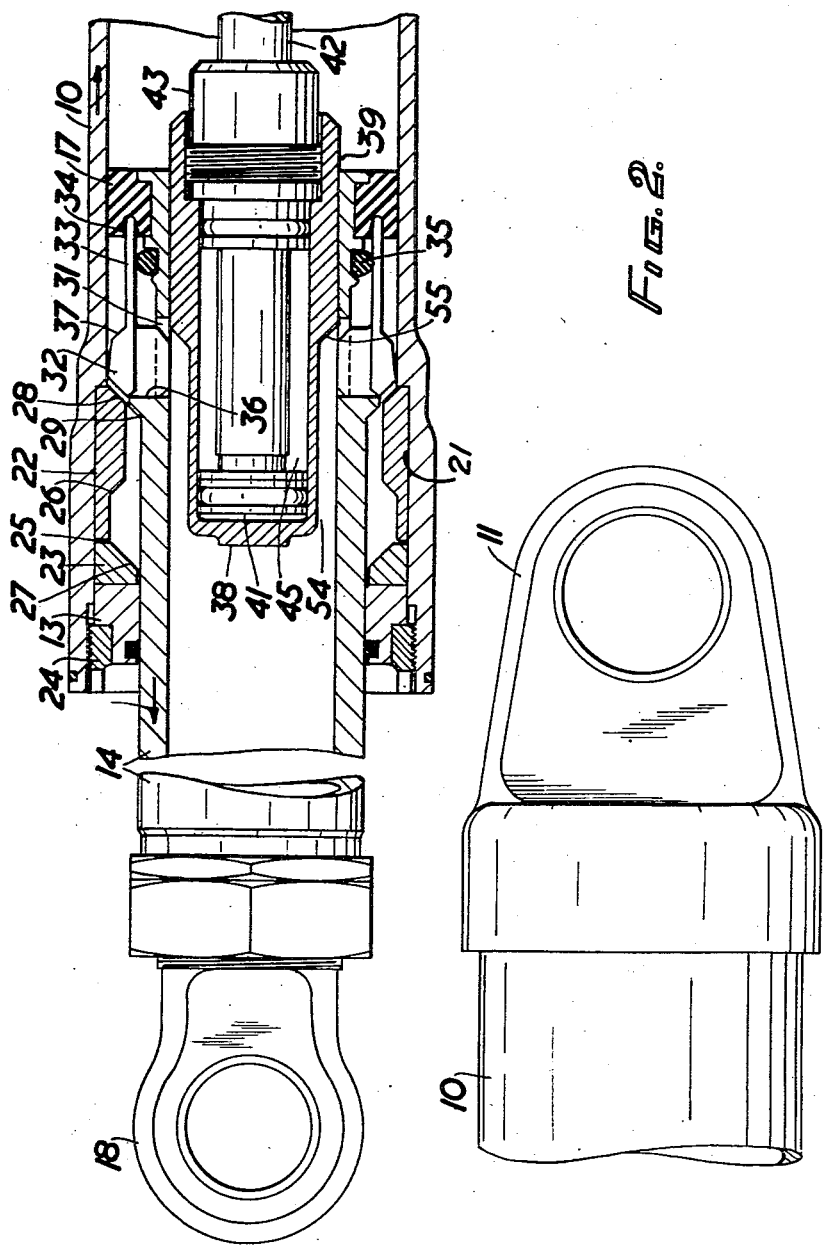
Figure 2 shows the strut partly in section with the two tubular components unlocked and somewhat contracted from their full extension.
Figure 3:
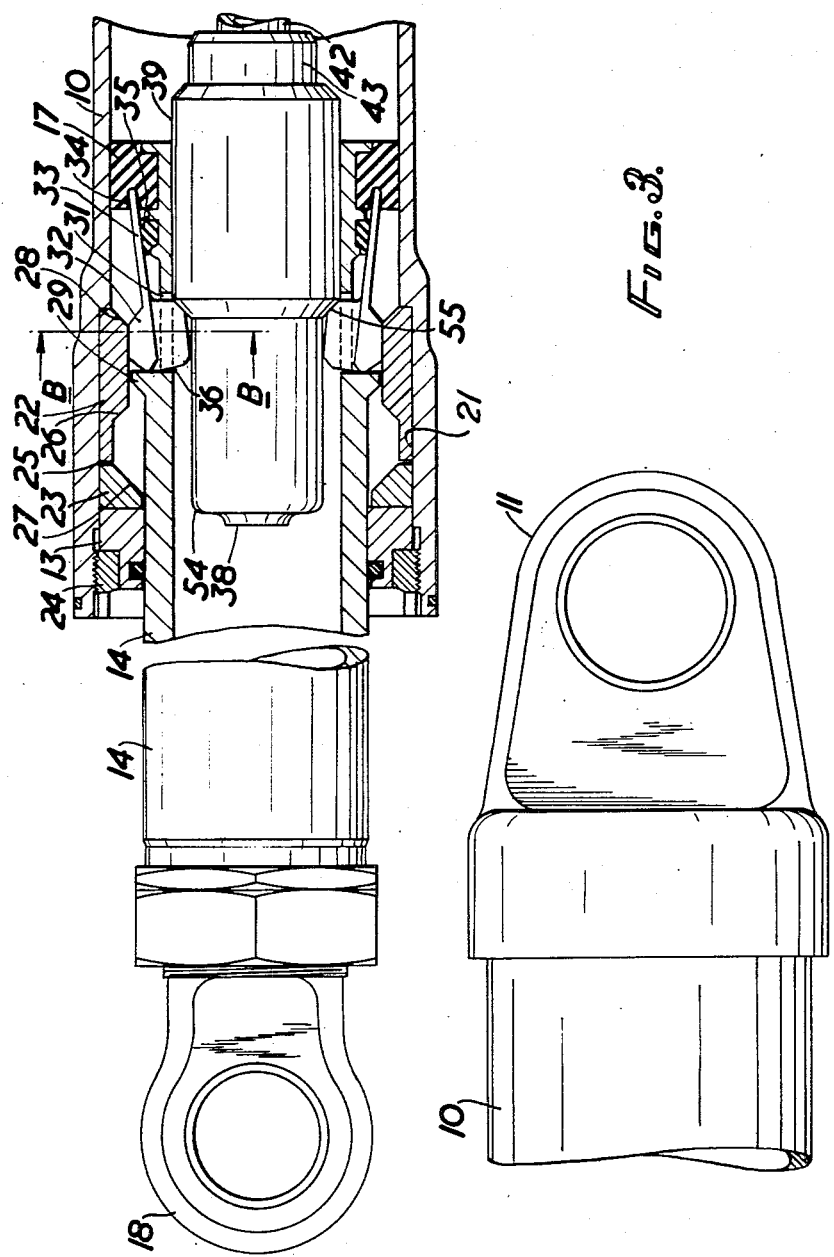
Figure 3 shows the telescopic strut partly in section with the two tubular components in a stage of extension intermediate those of Figures 1 and 2.
Figure 4:
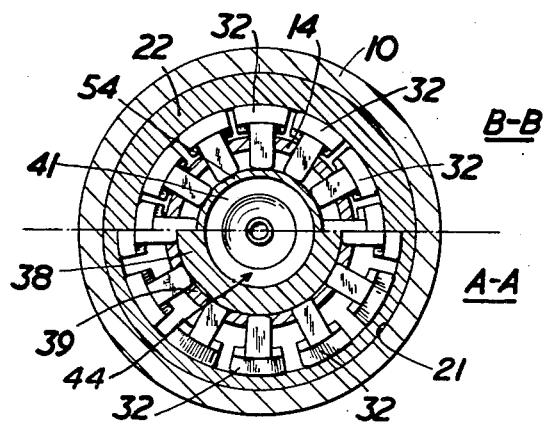
Figure 4 is a transverse section of the telescopic strut, the lower half of this section being on the line A—A of Figure 1 and the upper half being on the line B—B of Figure 3.

Considering now the case of extension of the strut by the aforesaid external means, and that the inner tubular component 14 with its associated locking tongues 33 have reached positions shown in Figure 2, then the heads 32 will engage the frusto-conical end face 28 of the locking sleeve 22 and be forced inwardly by them towards the reduced diameter surface 54 of the plunger 38 and commence to pass under the inner surface of the locking sleeve 22. If fluid pressure is then admitted to the cylindrical chamber 44, the plunger 38 will extend until its inclined step 55 abuts the radially inner surface of each locking tongue head 32 as shown in Figure 3. At this stage the heads 32 cannot move outwardly and since their transverse abutment faces 36 bear on the flange 29, the plunger 38 will react directly through the locking tongue heads 32 upon the inner tubular component 14 on which the flange 29 is formed to assist the extension of the inner component 14 within the outer component 10. When the heads 32 have traversed the inner surface of the locking sleeve 22 the heads 32 will then spread outwardly under the influence of the resilient ring 35 into the groove formed between the locking sleeve 22 and the retaining ring 23, and when fully extended in this groove the plunger 38 is free to complete its extension stroke whereupon the full diameter surface 39 passes underneath the radially inner surfaces of the locking tongue heads 32. The strut is then in a condition where it is able to withstand thrust and the thrust load will act directly from the circumferentially continuous flange 29 across the heads 32 onto the circumferentially continuous abutment surface 26 of the locking sleeve 22. No part of the thrust load is taken through the longitudinally extending portions of the locking tongues 33, and the purpose of these portions is merely to locate the tongues and to enable them to spread under the action of the resilient ring 35. The shim 25 may be selected upon assembly of the strut to ensure that there is no end play of the flange 29 on the inner tubular component 14 between the transverse faces 36 of the locking tongue heads 32 and the abutment face 27 of the retaining ring 23.

Figure 5:
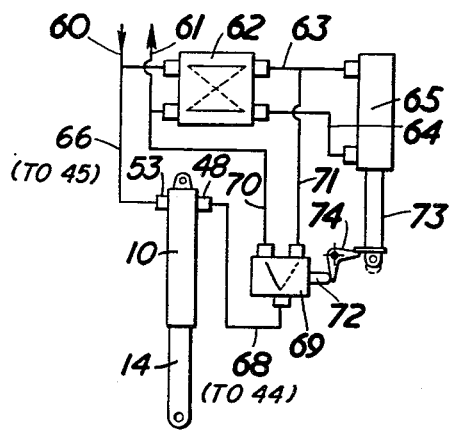
Figure 5 is a diagram of an aircraft hydraulic circuit illustrating the operational sequence of the telescopic strut which forms a part of a retractable wheel mounting.

The manner in which fluid pressure may be applied in the appropriate condiiton of the strut will now be described with reference to the hydraulic circuit of Figure 5 which relates to a retractable aircraft wheel mounting of which the strut forms part of the structure. Both the strut 10, 14 and a double-acting retraction jack may be connected to a hinged wheel-carrying leg whereby the movement of the strut 10, 14 is coordinated with that of the jack 65 during extension and retraction of the leg. In the circuit a pressure line 60 and a return line 61 are connected to a reversing valve 62 having output connections joined by service lines 63 and 64 to opposite sides of the double-acting retraction jack 65. The pressure line 60 has a branch 66 permanently connected with connector 53 leading to the annular chamber 45 of lesser area of the strut 10, 14 of the kind described. The cylindrical chamber 44 of the strut leading out to the connector 48 is connected by a line 68 with one side of a two-way valve 69, while the remaining connections of the valve 69 are joined one by a line 70 with the return line 61, and the other by a line 71 with the service line 63. It is arranged that except during the final extension and locking movement of the strut 10, 14 the line 68 is connected with the line 70 through the valve 69 so that the chamber 44 within the strut plunger 38 is at low pressure. The valve 69 has a plunger 72 which is operative to change the connection of the line 68 to the line 71 and this plunger 72 may be shifted by any movable part of the undercarriage structure, either the strut 10, 14 or other part whose movement is coordinated with it, when the strut has extended substantially to the condition illustrated in Figure 3, i. e. where each locking tongue head 32 has commenced to ride under the inner surface of the locking sleeve 22.

In the diagram, for simplicity, the plunger 72 is shown as being operable by the plunger 73 of the undercarriage retraction jack 65 through a lever 74 just before the end of the stroke of the plunger 73. When therefore, the valve 62 is set to extend the undercarriage, the connections through the valve being shown by full lines, pressure will be in the line 71 so that as soon as the jack plunger 73 trips the valve 69, and so connects line 71 with line 68, this pressure will pass from line 68 to the tube 46 of the strut 10, 14 and thence to the full area cylindrical chamber 44 to assist in the final extension of the strut 10, 14 and locking of same in the manner previously described. Upon retraction of the undercarriage, the valve 62 is reversed so that the connections through it are as shown by the dotted lines whereby the low pressure of the line 61 is now in the lines 63 and 71, and so within the chamber 44. This full area cylindrical chamber 44 of the locking plunger 38 being at low pressure, the plunger 38 withdraws under the fluid pressure permanently connected by way of the annular passageway 51 with the chamber 45, thereby unlocking the strut and permitting the undercarriage structure to fold under pressure in the line 64 to the retraction jack 65. As soon as the jack plunger 73 disengages the plunger 72 of the valve 69, the line 68 is once more connected with the line 70 which is also at low pressure, and the valve 69 is then in correct condition for the next extension movement of the undercarriage and ready to trip again upon completion of the extension movement.

I claim:

1. A telescopic strut comprising an outer and an inner tubular component relatively axially slidable in overlapping relationship, said outer component having a bore of constant diameter throughout most of its length, but being of reduced diameter inwardly of its overlapping end to define an inwardly facing groove axially outwardly of its portion of reduced diameter, a plurality of locking elements supported for axial movement with the inner component and for generally radial movement, and located intermediate the overlapping portions of the inner and outer components, distributed in a circle about the inner component, fluid-pressure-actuated locking means supported from and shiftable axially with respect to the outer component through a distance which is only a fraction of the travel of the inner component relative to the outer component, located within the overlapped end of the inner component, and within the circle of the locking elements, and having radially larger and smaller ends, respectively, and an intervening step, the locking elements being of radial dimensions to fill the annular space between the bottom of the outer component's groove and the larger end of the locking means, when the two components and said locking means are shifted axially to position the locking means in its locked position, with its larger end in registry with the groove, and to pass through the space between the reduced portion of the outer component's bore and the smaller end of the locking means when the two components and said locking means are shifted axially to position the locking means in its released position, with its larger end out of registry with the groove, the locking elements and the inner and outer components being complementally formed for transmission of axial thrust from either component to the other directly through the locking elements when parts are in the locked position, and for transmission of thrust in the extending sense from the step of the locking means to the inner member directly through the locking elements when parts are in the released position, and means to supply fluid pressure to the locking means to shift it axially with respect to the outer component towards locked and released positions, respectively.

2. A telescopic mechanical strut comprising outer and inner tubular components mounted slidably in overlapping relationship for relative axial movement under an externally applied force, a locking collar mounted within the overlapping end of the outer component and formed with a groove extending around its interior bore, a plurality of locking elements mounted in the overlapping end of the inner component for movement radially outwardly into engagement with the groove of the locking collar when the strut is extended, and for movement radially inwardly to permit contracting movement of the strut, locking means disposed within the inner tubular component, and fluid-pressure-actuated piston and cylinder members of which one member is fixed within and immovable with respect to the outer tubular component and the other member carries the locking means for axial movement thereof under fluid pressure actuation, said locking means being axially movable in one direction by fluid pressure applied to said piston and cylinder members, to release the locking elements, and so to permit the strut to be collapsed under an externally applied compression force, and being similarly movable in the other axial direction when the strut is subjected to an extension force, to apply an extension-assisting load to the locking elements and thence to the inner tubular component during the ultimate extension movement of the strut, and thereafter to expand the locking elements into engagement with the groove in the locking sleeve.

3. A telescopic mechanical strut comprising outer and inner tubular components mounted slidably in overlapping relationship for relative movement under an externally applied force, a locking collar mounted within the overlapping end of the outer component, a groove extending around the interior of the locking collar, a circular row of slots formed around the overlapping end of the inner component, a number of locking elements disposed captively, one in each slot, so as to be movable therein radially outwardly into engagement with the groove of the locking collar when the strut is extended, and movable therein radially inwardly to permit contracting movement of the strut, a cam disposed within the inner tubular component, said cam consisting of two cylindrical surfaces of greater and lesser diameter respectively separated by a step, and fluid-pressure-actuated piston and cylinder members of which one member is fixed within the outer tubular component and the other member carries the cam for movement thereof axially within the inner tubular component under fluid pressure actuation, said cam being movable in one direction to shift the cam surface of lesser diameter beneath the locking elements enabling these to contract and unlock the strut, and being movable in the other direction during the ultimate stage of the extension movement of the strut under an externally applied force, to apply an extension-assisting load by the action of the cam step through the locking elements upon the inner tubular component, said cam step being operative to expand the locking elements after these have traversed the bore of the locking sleeve into engagement with the groove therein.

4. A telescopic strut comprising outer and inner tubular components mounted slidably in overlapping relationship, a locking collar mounted within the overlapping end of the outer component, a groove extending around the interior of the locking collar, a circular row of slots formed around the overlapping end of the inner component, a number of locking elements disposed captively, one in each slot, so as to be movable radially outwardly and inwardly therein, a stem extending fixedly within the outer tubular component to a piston head disposed adjacent the overlapping end of the outer component, fluid passageways within said stem extending to openings on opposite sides of said piston, a cylindrical plunger mounted slidably on said piston and said stem to form a circular chamber in front of said piston and an annular chamber behind it, the exterior of said plunger being formed with cylindrical surfaces of lesser and greater diameter at the front and rear parts of the plunger respectively and including an inclined step separating the cylindrical surfaces, said plunger being shiftable under fluid-pressure in said annular chamber to bring the cylindrical surface of lesser diameter underneath the locking elements in the extended condition of the strut whereby said elements are free to contract from the groove in the locking collar under a thrust load applied to the strut, and said plunger being shiftable under fluid-pressure in said circular chamber during the ultimate extension movement of the strut to apply an extension-assisting load by the action of the inclined step through the locking elements upon the inner tubular component, said inclined step being operative to expand and pass beneath the locking elements, after these have traversed the bore of the locking collar, into engagement with the groove wherein said locking elements are retained by the greater diameter cylindrical surface of the plunger.

References Cited in the file of this patent

UNITED STATES PATENTS

| | | |
|---|---|---|
| 2,295,961 | Meyer | Sept. 15, 1942 |
| 2,393,962 | Ashton | Feb. 5, 1946 |
| 2,685,275 | Caldwell | Aug. 3, 1954 |

FOREIGN PATENTS

| | | |
|---|---|---|
| 493,471 | England | Oct. 10, 1938 |
| 896,839 | France | Apr. 8, 1944 |
| 362,577 | Italy | Aug. 30, 1938 |